US012762757B2

(12) United States Patent
Xue et al.

(10) Patent No.: US 12,762,757 B2
(45) Date of Patent: Oct. 13, 2026

(54) GENERATING CONTENT BASED ON TEXT AND SUPPLEMENTAL INFORMATION

(71) Applicant: Pinterest, Inc., San Francisco, CA (US)

(72) Inventors: David Ding-Jia Xue, San Francisco, CA (US); Eric Shulee Tzeng, Oakland, CA (US); Yu Wang, Charlottesville, VA (US); Yinan Zhang, San Mateo, CA (US)

(73) Assignee: Pinterest, Inc., San Francisco, CA (US)

( * ) Notice: Subject to any disclaimer, the term of this patent is extended or adjusted under 35 U.S.C. 154(b) by 180 days.

(21) Appl. No.: 18/459,888

(22) Filed: Sep. 1, 2023

(65) Prior Publication Data

US 2025/0078329 A1 Mar. 6, 2025

(51) Int. Cl.
*G06F 40/30* (2020.01)
*G06T 11/00* (2006.01)

(52) U.S. Cl.
CPC .............. *G06T 11/00* (2013.01); *G06F 40/30* (2020.01)

(58) Field of Classification Search
None
See application file for complete search history.

(56) References Cited

U.S. PATENT DOCUMENTS

2023/0055699 A1* 2/2023 Raziperchikolaei ..... G06N 3/08
2024/0037810 A1* 2/2024 Gong ...................... G06F 40/30
2024/0257179 A1* 8/2024 Lundin .............. G06Q 30/0252
2025/0021789 A1* 1/2025 Bennett .................. G06N 3/004
2025/0077842 A1* 3/2025 Ravi .................... G06N 3/0475

OTHER PUBLICATIONS

Extended European Search Report for European Patent Application No. 24197586.1 dated Dec. 6, 2024.
Liu, Vivian et al., "3DALL-E: Integrating Text-to-Image AI in 3D Design Workflows," arXiv, Jul. 31, 2023, pp. 1-23, XP093226426, Retrieved from the Internet: URL:https://arxiv.org.abs/2210.11603 [retrieved on Nov. 20, 2024].

(Continued)

*Primary Examiner* — Joni Hsu
(74) *Attorney, Agent, or Firm* — Gustafson IP

(57) ABSTRACT

Described are systems and methods for providing a content generation service that may be configured to generate content, such as digital images and the like, based on both a textual input and supplemental information. The content generation service may include one or more trained machine learning models that may be configured to generate an image based on a textual input and one or more supplemental information input(s). The supplemental information may include, for example, user information, content information, etc. and can provide context, preferences, or any other additional information beyond the textual input that may be used to generate the content. Further, the content generation service and/or the user may be able to assign weights to each of the textual input and the supplemental information input in connection with the generation of the content.

20 Claims, 10 Drawing Sheets

(56) References Cited

OTHER PUBLICATIONS

Das, Anindya Sundar, and Sriparna Saha. "Self-Supervised Image-to-Text and Text-to-Image Synthesis," Neural Information Processing: 28th International Conference, ICONIP 2021, Sanur, Bali, Indonesia, Dec. 8-12, 2021, Proceedings, Part IV 28. Springer International Publishing, 2021, URL: https://arxiv.org/pdf/2112.04928.pdf, 12 pages.
Kolluru, Sethu Hareesh. "A neural architecture to learn image-text joint embedding." (2019), www.stanford.edu, URL: https://web.stanford.edu/class/archive/cs/cs224n/cs224n.1194/reports/custom/15704570.pdf, 10 pages.
OpenAI, "DALL-E2," www.openai.com, OpenAI, L.L.C., OpenAI Copyright 2015-2023, accessed Mar. 31, 2023, URL: https://openai.com/product/dall-e-2, 16 pages.
Saharia, Chitwan, et al. "Photorealistic Text-to-Image Diffusion Models with Deep Language Understanding." 36th Conference on Neural Information Processing Systems (NeurIPS 2022): 36479-36494, URL: https://proceedings.neurips.cc/paper_files/paper/2022/file/ec795aeadae0b7d230fa35cbaf04c041-Paper-Conference.pdf.
Shi, Jing, et al. "Instantbooth: Personalized text-to-image generation without test-time finetuning." arXiv preprint arXiv:2304.03411 (Apr. 6, 2023), URL: https://jshi31.github.io/InstantBooth/, 13 pages.

* cited by examiner

GENERATING CONTENT BASED ON TEXT AND SUPPLEMENTAL INFORMATION

BACKGROUND

More and more aspects of the digital world are implemented, determined, or assisted by machine learning. Indeed, social networks, search engines, online sellers, advertisers, and the like, all regularly rely upon the services of trained machine learning models to achieve their various goals. One such emerging use of machine learning systems has been in connection with text-to-image image generation systems. In this regard, machine learning systems are generally employed to generate an image based on a textual input provided to the system. Although the generated image may be generated based on the provided textual input, such text-to-image image generation systems are typically limited to generating an image based solely on the textual input.

DETAILED DESCRIPTION

Figure 1A:
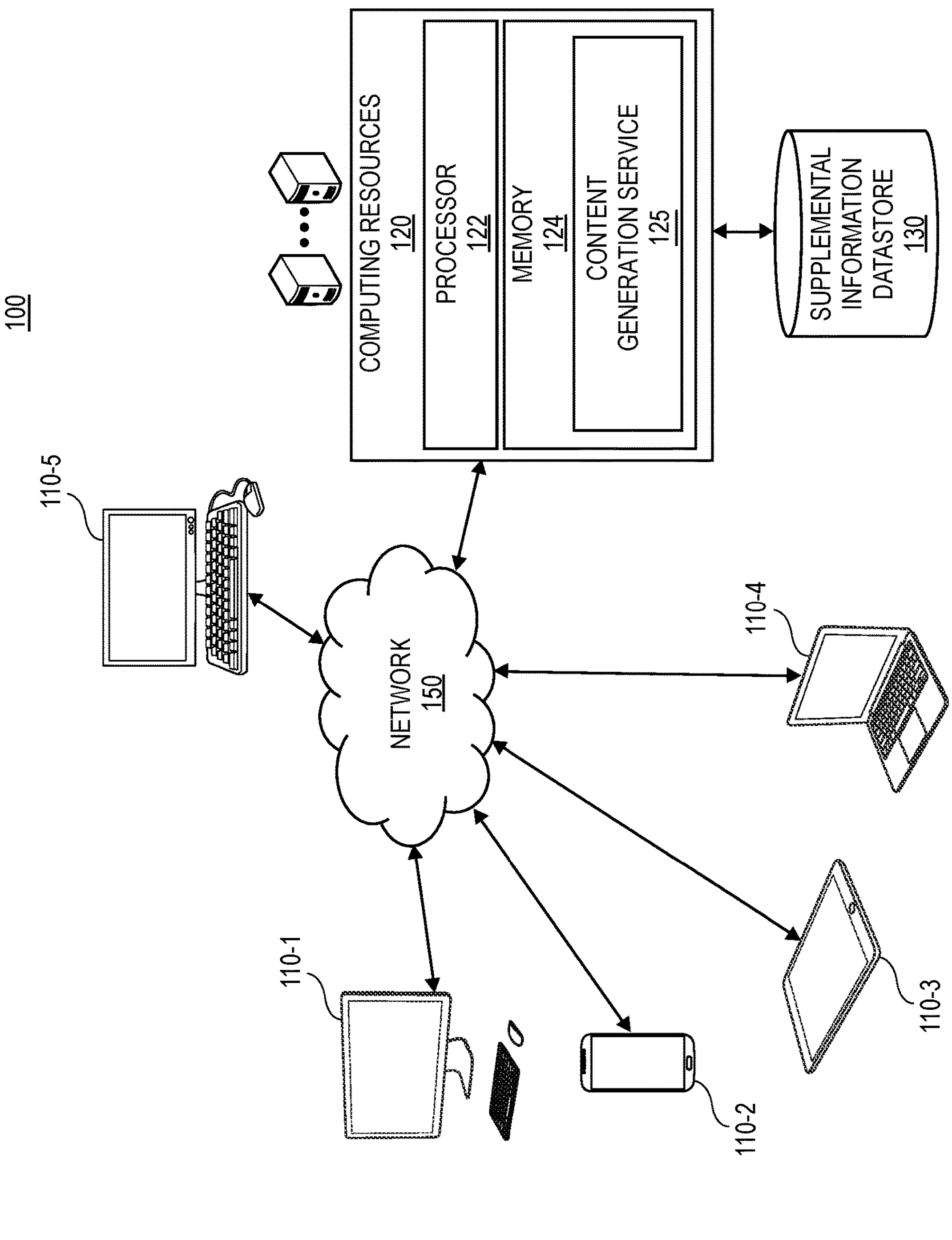
FIGS. 1A and 1B are illustrations of an exemplary computing environment, according to exemplary embodiments of the present disclosure.

As is set forth in greater detail below, exemplary embodiments of the present disclosure are generally directed to systems and methods for providing a content generation service that may be configured to generate content, such as digital images and the like, based on both a textual input and supplemental information. The content generation service may include one or more trained machine learning models that may be configured to generate an image based on a textual input and one or more supplemental information input(s). Further, the content generation service and/or the user may be able to assign weights to each of the textual input and the supplemental information input in connection with the generation of the content, so as to select which input is more heavily weighted. According to aspects of the present disclosure, the supplemental information may include, for example, user information, content information, etc. and can provide context, preferences, features, themes, or any other additional information beyond the textual input that may be used to generate the content. Accordingly, when compared to traditional text-to-image image generation systems, content generated by the exemplary content generation service provided according to exemplary embodiments of the present disclosure may generate content that is customized, modified, personalized, adjusted, and/or otherwise adapted in view of the supplemental information provided as an input to the exemplary content generation service.

According to exemplary embodiments of the present disclosure, the exemplary content generation service may include one or more machine learning models configured to generate content items based on a textual input and an input of supplemental information. Accordingly, the exemplary content generation service may be trained on a training dataset that includes triplets of textual information (e.g., a text string, etc.), a content item (e.g., an image, etc.), and supplemental information (e.g., user information, content information, etc.) that may be provided as an input to the exemplary content generation service. For example, the supplemental information may include user information, which may include a user embedding, vector, or other feature that may represent a user of the content generation service, content information, which may include one or more content embeddings, vectors or other feature that may represent one or more content items that may be provided to the content generation service as an input, and the like. Alternatively and/or in addition, the supplemental information may include a set of content items, which may include embeddings, vectors, or other representations of the content items. According to aspects of the present disclosure, the supplemental information can include any information, in addition to the textual input, that the content generation service may utilize in generating content.

In exemplary implementations where the supplemental information provided to the content generation service includes user information, the user information may include a user embedding that may be representative of the user and may encode the user's interactions with certain content items and may be configured to predict content with which the user may be expected to interact in the future. Alternatively and/or in addition, a user may be represented by one or more content items that are representative of the user. For example, the content items may include content items with which the user may have recently interacted, content items with which it is expected the user may interact, content items associated with the user's profile/history, and the like. Accordingly, the exemplary content generation service may be learned across a corpus of users (e.g., of an online service, etc.) so that the content generation service may learn unrelated associations that may be learned across the entire corpus of users. In an exemplary implementation, the training data set may include triplets of user information, text queries submitted by the user, and content items with which the user interacted in response to the queries. Accordingly, content generated by the exemplary content generation service may be customized and/or adapted to the user based on the user information associated with the user and provided to the content generation service.

In another exemplary implementation, the supplemental information may include content information. For example, the content information may include one or more content items and/or representations of the one or more content items (e.g., content embeddings, vectors, etc.). The content items may be similar to each other, grouped as a collection or set, have a common theme, classification, and/or category, etc. or may serve as an example content item for the content generation service to process in generating the content. In exemplary implementations where the supplemental information provided to the content generation service includes content information, the content generation service may be provided the content information so that the content generation service may generate content, based on the textual input in view of the content information, that may be included in a collection of content items associated with the content information.

Advantageously, the exemplary content generation service provided according to exemplary embodiments of the present disclosure can facilitate the generation of personalized and/or customized content based on supplemental information that goes beyond a mere text input. Accordingly, the generated content may be customized, modified, adjusted and/or otherwise adapted in view of the supplemental information provided as an input to the exemplary content generation service to obtain highly personalized and/or customized content based on user information, content information, and the like.

Figure 1B:
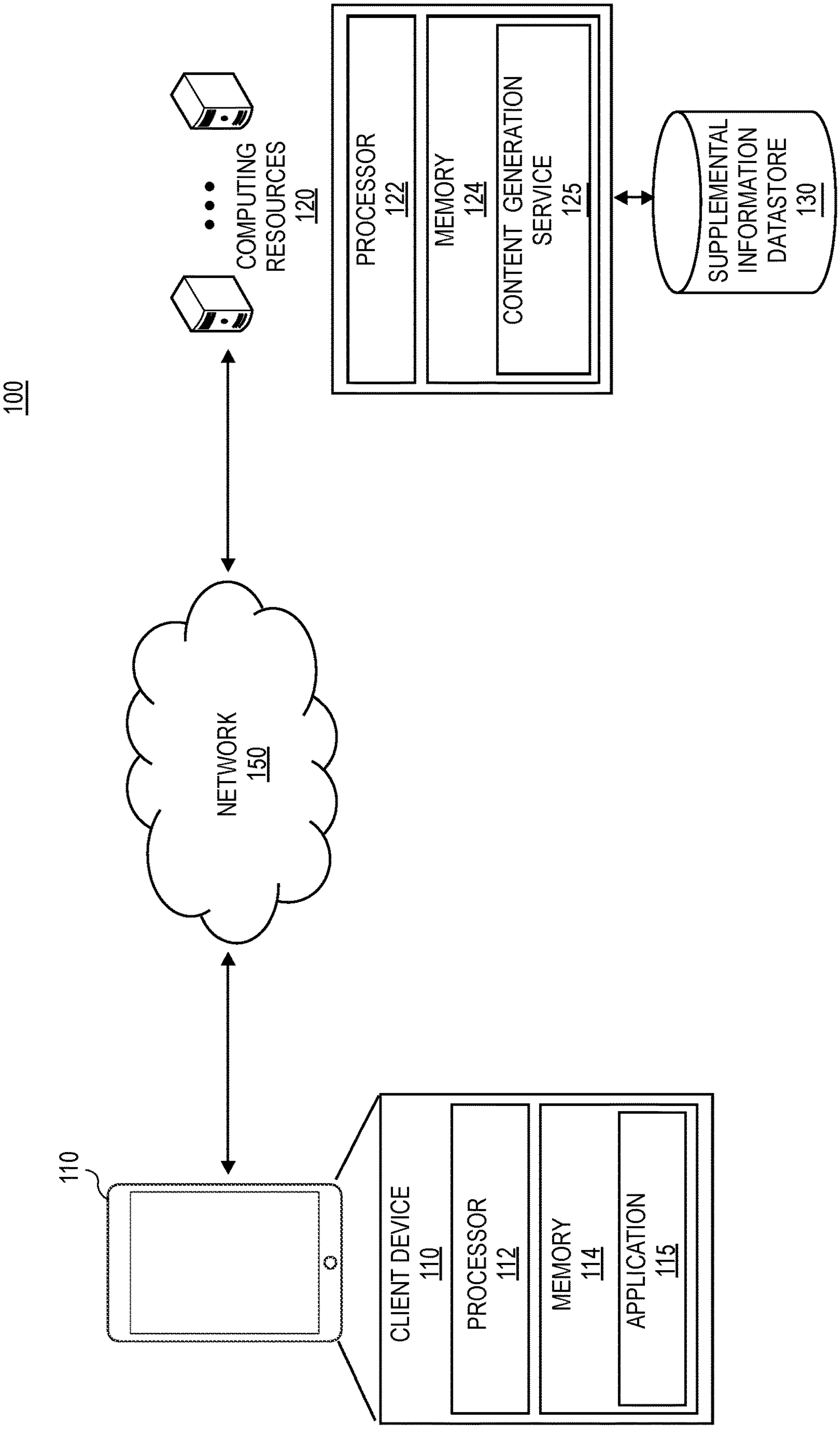

FIGS. 1A and 1B are illustrations of an exemplary computing environment 100, according to exemplary embodiments of the present disclosure.

As shown in FIG. 1A, computing environment 100 may include one or more client devices 110 (e.g., client device 110-1, 110-2, 110-3, 110-4, and/or 110-5), also referred to as user devices, for connecting over network 150 to access computing resources 120. Client devices 110 may include any type of computing device, such as a smartphone, tablet, laptop computer, desktop computer, wearable, etc., and network 150 may include any wired or wireless network (e.g., the Internet, cellular, satellite, Bluetooth, Wi-Fi, etc.) that can facilitate communications between client devices 110 and computing resources 120. Computing resources 120 may include one or more processors 122 and one or more memory 124, which may store one or more applications, such as content generation service 125, that may be executed by processor(s) 122 to cause the processor(s) 122 of computing resources 120 to perform various functions and/or actions. According to aspects of the present disclosure, computing resources 120 may represent at least a portion of a networked computing system that may be configured to provide online applications, services, computing platforms, servers, and the like, such as a social networking service, social media platform, e-commerce platform, content recommendation services, search services, and the like, that may be configured to execute on a networked computing system. Further, computing resources 120 may communicate with one or more datastore(s), such as supplemental information datastore 130, which may be configured to store and maintain a corpus of supplemental information (e.g., user information, content information, etc.) which may be provided to content generation service 125 in connection with the generation of content by content generation service 125 that may be provided to client devices 110 in response to a request for generated content. The supplemental information stored and maintained by supplemental information datastore 130 may include embeddings, vectors, and other features that may be representative of user, content, and the like.

According to exemplary implementations of the present disclosure, computing resources 120 may be representative of computing resources that may form a portion of a larger networked computing platform (e.g., a cloud computing platform, and the like), which may be accessed by client devices 110. Computing resources 120 may provide various services and/or resources and do not require end-user knowledge of the physical premises and configuration of the system that delivers the services. For example, computing resources 120 may include "on-demand computing platforms," "software as a service (SaaS)," "infrastructure as a service (IaaS)," "platform as a service (PaaS)," "platform computing," "network-accessible platforms," "data centers," "virtual computing platforms," and so forth. As shown in FIG. 1A, computing resources 120 may be configured to execute and/or provide a social media platform, a social networking service, a recommendation service, a search service, an e-commerce platform, or any other form of interactive computing, which may employ content generation service 125. Example components of a remote computing resource, which may be used to implement computing resources 120, are discussed below with respect to FIG. 7.

As illustrated in FIGS. 1A and 1B client devices 110 may access and/or interact with content generation service 125 through network 150 via one or more applications 115 operating and/or executing on client devices 110. For example, users associated with client devices 110 may launch and/or execute such an application on client devices 110 to access and/or interact with applications and/or services executing on computing resources 120 via network 150. According to aspects of the present disclosure, a user may, via execution of application 115 on client devices 110, access or log into services executing on computing resources 120 by submitting one or more credentials (e.g., username/password, biometrics, secure token, etc.) through a user interface presented on client devices 110.

Once logged into services executing on remote computing resources 120, users associated with client devices 110 may request the generation of content, perform searches and/or queries for content, view content, access content, and/or otherwise consume content on client devices 110 as part of a social media platform or environment, a networking platform or environment, an e-commerce platform or environment, or through any other form of interactive computing. In connection with the user's activity on client devices 110 with the online services provided by computing resources 120, which may include a request for the generation of content, searches and/or queries for content, and the like, a request for the generation of content may be received from client devices 110 by computing resource 120. For example, a request for generation of content may be in the form of an express request for the generation of content, be included as part of a search or query (e.g., a text-based query, etc.), a request to access a homepage and/or home feed, a request for recommended content items, and the like. Alternatively and/or in addition, services executing on remote computing resources 120 may push generated content items to client devices 110. For example, services executing on remote computing resources 120 may push content items to client devices 110 on a periodic basis, after a certain period of time has elapsed, based on certain activity associated with client devices 110, upon identification of relevant and/or recommended content items that may be provided to client devices 110, and the like.

In connection with a request for the generation of content, content generation service 125 may obtain a textual input and a supplemental information input (e.g., user information, content information, etc.), which may be stored and maintained by supplemental information datastore 130. The textual input and the supplemental information may be processed by content generation service 125 to generate a content item (e.g., digital image, etc.) based on the textual input and the supplemental information input. According to exemplary embodiments of the present disclosure, content generation service 125 may include one or more machine learning models, such as deep neural networks ("DNN"), trained to generate content based on a text input and a second input of supplemental information.

According to exemplary implementations of the present disclosure, the textual input may include a text string of one or more words that may be processed by the content generation service 125 to generate content. For example, the textual input may simply include a single word, such as "car," "dog," "cat," etc. or a sequence of words, such "a black off-road vehicle on an off-road trail," "a red sports car on a track," "a black and white cat eating a fish," etc. Further, the supplemental information may include user information, content information, or any other information on which content generation service 125 may process in generating content. For example, supplemental information may include user information, which may include a user embedding, vector, etc. that is representative of the user and may be generated by a trained model. The user embedding may represent user preferences, the user's past actions, the user's predicted actions (e.g., predicted interactions with content, etc.), and the like, which may guide the generation of a content item by content generation service 125. According to an exemplary implementation, a user may be represented by a set of content items that are representative of the user. For example, the content items may include content items with which the user has interacted, content items associated with the user (e.g., user information, user history, user profile, etc.), and/or content items with which it is expected that the user will interact. Alternatively and/or in addition, supplemental information may include content information, which may include content items and/or representations (e.g., content embeddings, vectors, etc.) of one or more content items that may guide the generation of a content item by content generation service 125. According to aspects of the present disclosure, content generation service 125 may identify certain parameters, characteristics, features, etc. that may be modified and/or adjusted in generation of the content item in view of the textual input and the supplemental information.

According to exemplary embodiments of the present disclosure, the textual input and the supplemental information may be preprocessed prior to being provided to content generation service 125. For example, the textual input may be processed by one or more language models (e.g., bidirectional encoder representations from transformers (BERT) model, natural language processing models, etc.) to generate one or more text embeddings representative of the words, n-grams, etc. included in the textual input. In one exemplary implementation, the text embeddings associated with each word and/or n-gram of the textual input may be averaged to generate a representative textual input embedding that is representative of the textual input. The representative textual input embedding may be concatenated with the supplemental information (e.g., user embedding, content embedding, etc.), and the concatenated embeddings may then be provided to and processed by content generation service 125 in generating one or more content items. In another exemplary implementation, the language model may generate a sequence of embeddings that represents the textual input, where each embedding of the sequence of embeddings corresponds to a word, n-gram, etc. of the textual input. Accordingly, the supplemental information (e.g., user embedding, content embedding, etc.) may be appended to the sequence of embeddings (e.g., as the first or last embedding in the sequence of embeddings, etc.), and the sequence of embeddings may be provided to and processed by content generation service 125 to generate one or more content items. According to yet another aspect of the present disclosure, the supplemental information may be converted into a text token/embedding (e.g., using a trained model such as an image encoder, etc.) and provided to content generation service 125 as part of the textual input. Optionally, the supplemental information may also be provided directly as an input to content generation service 125 (e.g., as an embedding or other encoded representation, etc.).

In an exemplary implementation where a user provides a textual input of "camping car" to content generation service 125 in connection with a request to generate content, content generation service 125 may also be provided with supplemental information (e.g., a user embedding representative of the user, a set of content embeddings, etc.) associated with and/or provided by the user that submitted the request to generate content as supplemental information. Accordingly, the textual input "camping car" may be processed by a language model to generate a text embedding for each word of the textual input "camping car." The generated text embeddings may be averaged to generate a fixed length token, and the token may be concatenated with a user embedding representative of the user to generate an input embedding, which may be provided to and processed by content generation service 125. Alternatively, the textual input "camping car" may be processed by a language model to generate a sequence of text embeddings corresponding to each word of the textual input "camping car." while maintaining the order of the words as the appear in the textual input, and the supplemental information may be appended to the sequence of text embeddings corresponding to the words of the textual input "camping car" to generate an input sequence of embeddings, which may be provided to and processed by content generation service 125. According to yet another exemplary implementation, the supplemental information may be converted into a text token/embedding (e.g., using a trained model such as an image encoder, etc.) and provided to content generation service 125 as part of the textual input. Optionally, the supplemental information may also be provided directly as an input to content generation service 125 (e.g., as an embedding or other encoded representation, etc.).

Accordingly, content generation service 125 may generate an image of a "camping car" based on the input embedding, the input sequence of embeddings, the text tokens/embeddings (including the converted supplemental information) and the supplemental information, and the like. For example, the "camping car" generated by content generation service 125 may incorporate preferences, likes, learned associations, etc. associated with the supplemental information that may be identified based on the provided supplemental information (e.g., the user embedding, set of content embeddings, etc.). Accordingly, content generation service 125 may, based on the supplemental information, determine and/or customize the generated content to include a certain brand, model, style (e.g., sedan, sports car, SUV, minivan, pickup truck, wagon, classic car, etc.), color, setting/background (e.g., racetrack, rural environment, urban environment, desert environment, etc.), and the like in view of the supplemental information provided to content generation service 125 in connection with the generation of one or more content items. Accordingly, in an exemplary implementation where the supplemental information may include a user embedding, in connection with a first user, content generation service 125 may generate, based on user information associated with the first user, an image of a white and brown recreational vehicle parked in the desert in response to a textual input of "camping car." In connection with a second user, content generation service 125 may generate, based on user information associated with the second user, a black SUV parked in the woods next to a stream in response to the same textual input of “camping car.”

Similarly, in exemplary implementation where a user provides a textual input of “camping car” to content generation service 125 in connection with a request to generate content, content generation service 125 may also be provided with input content information (e.g., one or more content embeddings representative of one or more input content items, etc.) in connection with the request to generate content as supplemental information. The content information may, for example, include a style, theme, category, classification, etc. that may be considered in the generation of a content item by content generation service 125. For example, a user may want to have content generated that may be included in an already existing collection of content items. Accordingly, the user may provide one or more content items of the existing collection of content items to content generation service 125 as supplemental information in connection with the request for generation of content. By way of another example, in circumstances where a user may want to generate content having a style or theme that is similar to existing content, the user may provide the existing content to the content generation service 125 as the supplemental information in connection with the request for generation of content.

Continuing the exemplary implementation where the textual input “camping car” is provided to content generation service 125, textual input “camping car” may be processed by a language model to generate a text embedding for each word of the textual input “camping car.” The generated text embeddings may be averaged to generate a fixed length token, and the token may be concatenated with a content embedding representative of the input content items to generate an input embedding, which may be provided to and processed by content generation service 125. Alternatively, the textual input “camping car” may be processed by a language model to generate a sequence of text embeddings corresponding to each word of the textual input “camping car,” while maintaining the order of the words as the appear in the textual input, and the content embedding may be appended to the sequence of text embeddings corresponding to the words of the textual input “camping car” to generate an input sequence of embeddings, which may be provided to and processed by content generation service 125. According to yet another exemplary implementation, the content items may be converted into one or more text tokens/embeddings (e.g., using a trained model such as an image encoder, etc.) and provided to content generation service 125 as part of the textual input. Optionally, the content items may also be provided directly as an input to content generation service 125 (e.g., as an embedding or other encoded representation, etc.).

Accordingly, content generation service 125 may generate an image of a “camping car” based on the input embedding and/or the input sequence of embeddings. For example, the “camping car” generated by content generation service 125 may incorporate styles, themes, features, classifications, items, categories, etc. of the content items that may be identified based on the provided content information (e.g., the content embedding). For example, based on the content information, content generation service 125 may determine and/or customize the generated content to include a certain brand, model, style (e.g., sedan, sports car, SUV, minivan, pickup truck, wagon, classic car, etc.), color, setting/background (e.g., racetrack, rural environment, urban environment, desert environment, etc.), and the like in view of the content information provided to content generation service 125.

According to certain aspects of the present disclosure, a request for generated content may be included in connection with a search or query submitted by a user. For example, a user may submit a text query (e.g., “camping car”) in connection with a search for relevant content. In connection with the submission of the text query, a request for generated content may be transmitted to content generation service 125. The request for generated content may include the text query as the textual input and user information associated with the user submitting the query as the supplemental information. Accordingly, content generation service 125 may generate content based on the text query and the user information, as described herein, and the generated content may be returned in response to the text query as a relevant and/or responsive content item in response to the submitted text query.

Similarly, in connection with an image query, keywords may be identified from the image query (e.g., items identified in the image, categories of items identified in the image, classifications of items identified in the image, etc.), and the identified keywords may be provided to content generation service 125 as the textual input. Additionally, an image embedding corresponding to the image query and/or a user embedding associated with the user submitting the query may be provided to content generation service 125 as supplemental information. Accordingly, content generation service 125 may then generate content based on the textual input (e.g., the identified keywords) and either the image embedding and/or the user embedding, as described herein, and the generated content may be returned in response to the image query as a relevant and/or responsive content item in response to the submitted image query.

Figure 2:
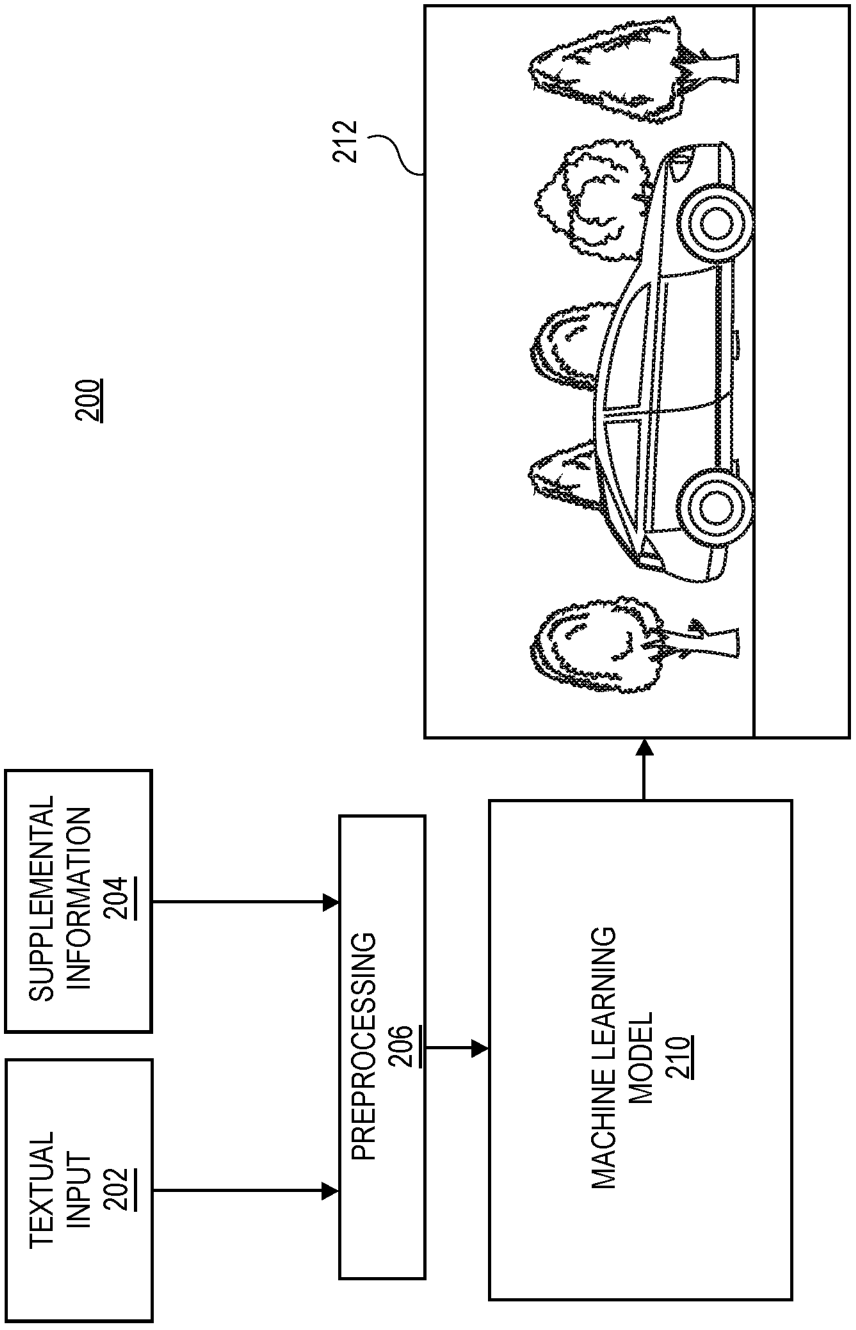
FIG. 2 is a block diagram illustrating an exemplary content generation system, according to exemplary embodiments of the present disclosure.

FIG. 2 is a block diagram illustrating an exemplary content generation system 200, according to exemplary embodiments of the present disclosure. The exemplary content generation system 200 illustrated in FIG. 2 may, for example, be implemented by an online service, such as a social media network, a social networking service, a search service, a recommendation service, and the like.

As shown in FIG. 2, exemplary content generation system 200 may generate content item 212 based on textual input 202 and supplemental information 204. According to exemplary embodiments of the present disclosure, textual input 202 and supplemental information 204 may be provided to content generation system 200 in connection with a request for the generation of content. A request for the generation of content may be in the form of an express request for the generation of content, be included as part of a search or query (e.g., a text-based query, image-based query, etc.), a request to access a homepage and/or home feed, a request for recommended content items, and the like. Alternatively and/or in addition, content may be generated in connection with determinations to push content items to users.

According to certain implementations of the present disclosure, text input 202 may be a search or query submitted. For example, text input 202 may form a search or query submitted by a user seeking relevant and/or responsive content. Accordingly, in addition to identifying and returning content items that are relevant and/or responsive to text input 202, content generation system 200 may generate content item 212, which may also be returned in response to the search or query as a relevant and/or responsive content item (e.g., in addition to the other identified and returned content items).

According to another exemplary implementation of the present disclosure, text input 202 and supplemental information 204 may be provided in connection with a request to generate content. For example, a user may desire to have a content item generated that may be included in an already existing collection of content items. Accordingly, supplemental information 204 may include one or more content items (or representations thereof) from the collection of content items, and a user may provide supplemental information 204 (e.g., one or more content items from the collection of content items) and text input 202 (e.g., as a description of the desired content, etc.) in connection with the request to generate content for inclusion in the collection of content items. Accordingly, content generation system 200 may generate content item 212, which may be returned in response to the request for a content item to be included in the collection of content items based on text input 202 and supplemental information 204.

According to aspects of the present disclosure, textual input 202 may include a text string of one or more words that may describe the content to be generated. For example, textual input 202 may simply include a single word, such as "car," "dog," "cat," etc. or a sequence of words, such as "a black off-road vehicle on an off-road trail," "a red sports car on a track," "a black and white cat eating a fish," "mountain scene," etc. Textual input 202 may be provided by a user requesting the generation of content or may be automatically generated based on other content and/or information associated with the user.

Additionally, supplemental information 204 may include any further information that may be processed by content generation system 200 in the generation of content. For example, supplemental information 204 may include user information, content information, and the like. In exemplary implementations, supplemental information 204 may be encoded as representations of a user, content, etc. in the form of embeddings, vectors, or other features. In exemplary implementations where supplemental information 204 includes user information, the user information may include a user embedding that may be representative of the user. The user embedding may include a vector representation of the user that is generated by a trained machine learning model and may represent a user's preferences, a user's history, a user's past actions (e.g., content items with which the user may have interacted, etc.), a user's predicted actions (e.g., content items with which the user is predicted to interact, etc.), and the like. Alternatively and/or in addition, supplemental information may include content information, which may include one or more content embeddings generated by a trained machine learning model and may include a vector representation of the content items that encode certain features of the content items.

As illustrated in FIG. 2, textual input 202 and supplemental information 204 may be processed by preprocessing block 206, and the output of preprocessing block 206 may be provided to machine learning model 210, which may be processed by machine learning model 210 to generate one or more content items (e.g., such as content item 212). According to exemplary embodiments of the present disclosure, preprocessing block 206 may include one or more language models (e.g., natural language processing models, BERT models, etc.) that may be configured to parse textual input 202 into words and/or n-grams included in textual input 202 and generate one or more text embeddings that represent the words, n-grams, etc. included in textual input 202. In one exemplary implementation, the text embeddings associated with each word and/or n-gram included in textual input 202 may be averaged to generate an overall text embedding that is representative of textual input 202. Alternatively, a text embedding may be generated for each word or n-gram of textual input 202 to generate a sequence of the text embeddings for textual input 202, where the sequence of the text embeddings may correspond to the order in which the words or n-grams appear in textual input 202.

In addition to generating one or more text embeddings that may represent textual input 202, preprocessing block 206 may also combine representations of textual input 202 and supplemental information 204. For example, in exemplary implementations where supplemental information 204 includes an embedding (e.g., a user embedding, a content embedding, etc.) that encodes and is representative of supplemental information 204, preprocessing block 206 may combine the textual embedding(s) representing textual input 204 and the embedding(s) representing supplemental information 204. According to exemplary implementations of the present disclosure where textual input 202 is represented by a single text embedding, the text embedding representative of textual input 202 may be concatenated with the embedding (e.g., user embedding, content embedding, etc.) that represents supplemental information 204, and the concatenated embedding may then be provided to and processed by machine learning model 210. In other implementations where textual input 202 is represented by a sequence of text embeddings, the embedding (e.g., user embedding, content embedding, etc.) representing supplemental information 204 may be appended to the sequence of text embeddings (e.g., as the first or last embedding in the sequence of embeddings, etc.), and the sequence of embeddings may be provided to and processed by machine learning model 210.

According to yet another exemplary implementation, the content items may be converted into one or more text tokens/embeddings (e.g., using a trained model such as an image encoder, etc.) and provided to machine learning model 210 as part of the textual input. Optionally, the content items may also be provided directly as an input to machine learning model 210 to be processed by one or more layers of machine learning model 210 (e.g., as an embedding or other encoded representation, etc.).

According to exemplary embodiments of the present disclosure, machine learning model 210 may include one or more machine learning models trained and configured to generate content based on a textual input (e.g., textual input 202) and an input of supplemental information (e.g., supplemental information 204). According to exemplary embodiments of the present disclosure, machine learning model 210 may have been trained on a training dataset that includes triplets of textual information, content, and the supplemental information that is to be provided to machine learning model 210 as an input. In exemplary implementation where supplemental information 204 includes user information, machine learning model 210 may be trained on a training dataset including triplets of a text string, a content item, and a representation of a user across a corpus of users. For example, machine learning model 210 may be learned across a corpus of users (e.g., of an online service such as a social media network, a social networking service, a search service, a recommendation service, etc.) so that the content generation service may learn unrelated associations that may be learned across the entire corpus of users.

In one exemplary implementation where supplemental information 204 may include content information corresponding to content items included in a collection of content items, machine learning model 210 may have been trained on a training dataset that includes triplets of textual information, a training content item, and content items that form a collection of content items that include the training content item. In exemplary implementations, machine learning model 210 may be learned across a corpus of content item collections (e.g., of an online service such as a social media network, a social networking service, a search service, a recommendation service, etc.).

In an exemplary implementation, the training data set may include triplets of user information (e.g., user embeddings, etc.), text queries submitted by the user, and content items with which the user interacted in response to the corresponding text queries. Alternatively and/or in addition, machine learning model 210 may be trained using datasets having data records of any triplets that may include a text string, a content item, and the supplemental information which may be provided as an input to machine learning model 210 and processed in generating content.

As illustrated in FIG. 2, textual input 202 and supplemental information 204 may be provided to content generation system 200 in connection with a request to generate a content item. In an exemplary implementation, textual input 202 may include a text string "camping car" and supplemental information 204 may include content information associated with a set of content items. Alternatively and/or in addition, supplemental information 204 may include user information (e.g., in the form of a user embedding, etc.) and the like. According to other aspects of the present disclosure, supplemental information 204 may include other types of information that may be considered by content generation system 200 in generating content item 212.

Upon receipt of textual input 202, preprocessing block 206 may tokenize or otherwise parse the text string "camping car" included in textual input 202 to determine one or more words, n-grams, and the like included in the text string and may generate a text embedding for each word or n-gram. According to an exemplary implementation, the generated text embeddings may be averaged to generate an overall text embedding that is representative of the entire text string. Alternatively, preprocessing block 206 may generate a sequence of text embeddings corresponding to each word of the textual input "camping car," while maintaining the order of the words as the appear in the textual input 202. Accordingly, the resulting sequence of text embeddings may be TEXT EMBEDDING A, TEXT EMBEDDING B, where TEXT EMBEDDING A corresponds to "camping" and TEXT EMBEDDING B corresponds to "car."

After the text string of textual input 202 has been processed to either generate the overall text embedding that is representative of the entire text string included in textual input 202 or a sequence of text embeddings that is representative of the entire text string has been determined, the overall text embedding or the sequence of text embeddings may be combined with supplemental information 204. For example, in the implementation where an overall text embedding is generated, the user embedding provided as supplemental information 204 may be concatenated with the overall text embedding. Alternatively, in the implementation where a sequence of text embeddings is generated, the user embedding provided as supplemental information 204 may be appended to the sequence of text embeddings (e.g., such that the user embedding is the first embedding or last embedding in the sequence of embeddings, etc.). According to yet another exemplary implementation, supplemental information 204 may be converted into a text token/embedding (e.g., using a trained model such as an image encoder, etc.) and provided to machine learning model 210 as part of textual input 202. Optionally, the content items may also be provided directly as an input to machine learning model 210 to be processed by one or more layers of machine learning model 210 (e.g., as an embedding or other encoded representation, etc.).

Accordingly, the concatenated embedding and/or the sequence of embeddings may be provided to machine learning model 210 so that a content item may be generated based on textual input 202 and supplemental information 204. As shown in FIG. 2, machine learning model 210 may generate content item 212 based on the text string "camping car" included in textual input 202 and the set of content items provided as supplemental information 204. For example, content item 212 generated by machine learning model 210 may be an image of a "camping car" generated in view of the set of content items provided as supplemental information 204. For example, content item 212 may include a depiction of a "camping car" while incorporating features, themes, colors, moods, classifications, categories, common/shared features, locations, etc. of that may be identified based on the set of content items provided as supplemental information 204. Accordingly, machine learning model 210 may, based on the content items, determine and/or customize the generated content to include a certain brand, model, style (e.g., sedan, sports car, SUV, minivan, pickup truck, wagon, classic car, etc.), color, setting/background (e.g., racetrack, rural environment, urban environment, desert environment, etc.), and the like in view of the content items provided as supplemental information 204 to content generation system 200. Content item 212 may then be provided as a generated content item in response to the request for generated content.

Figure 3A:
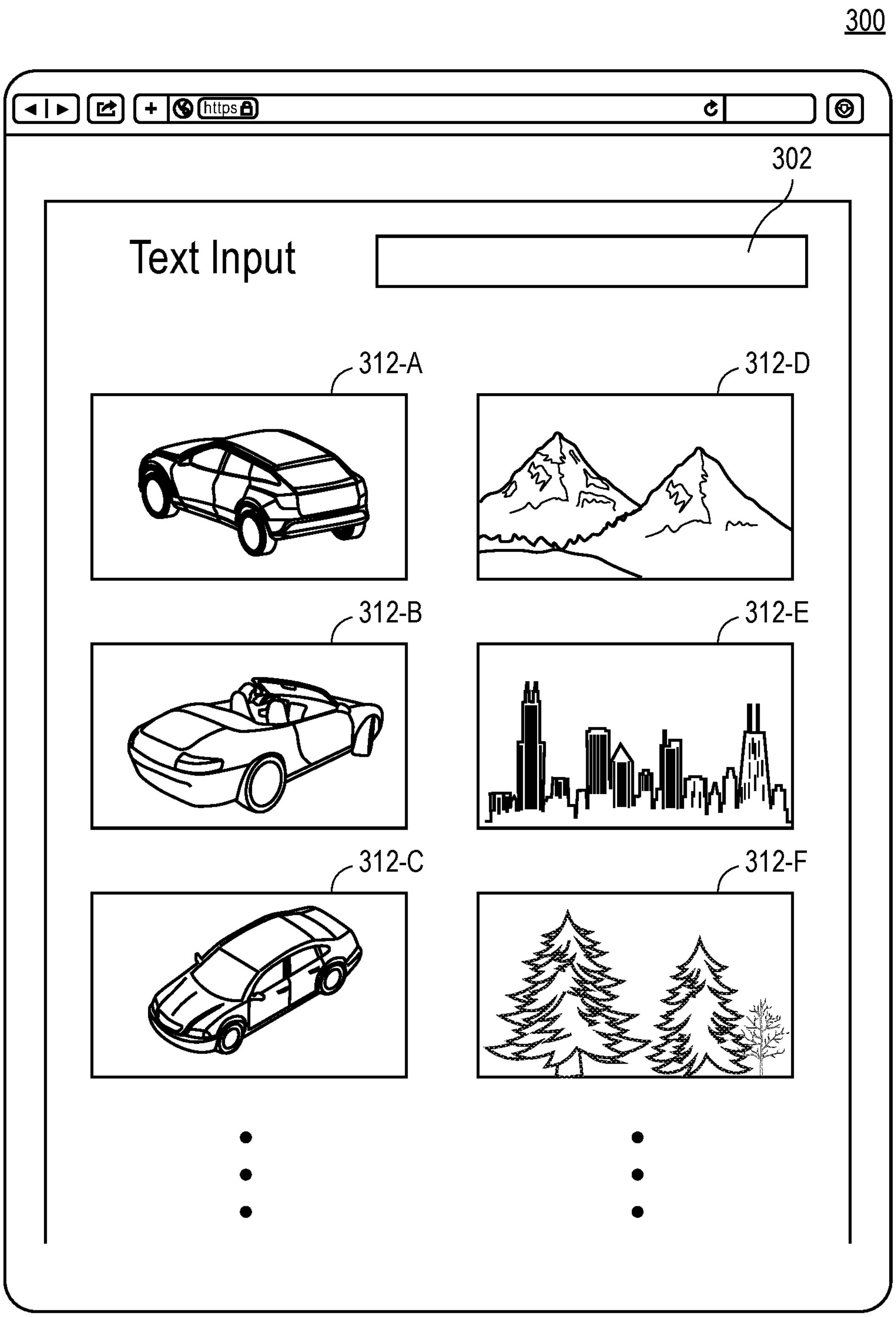
FIGS. 3A-3C are illustrations of exemplary user interfaces, according to exemplary embodiments of the present disclosure.
Figure 3B:
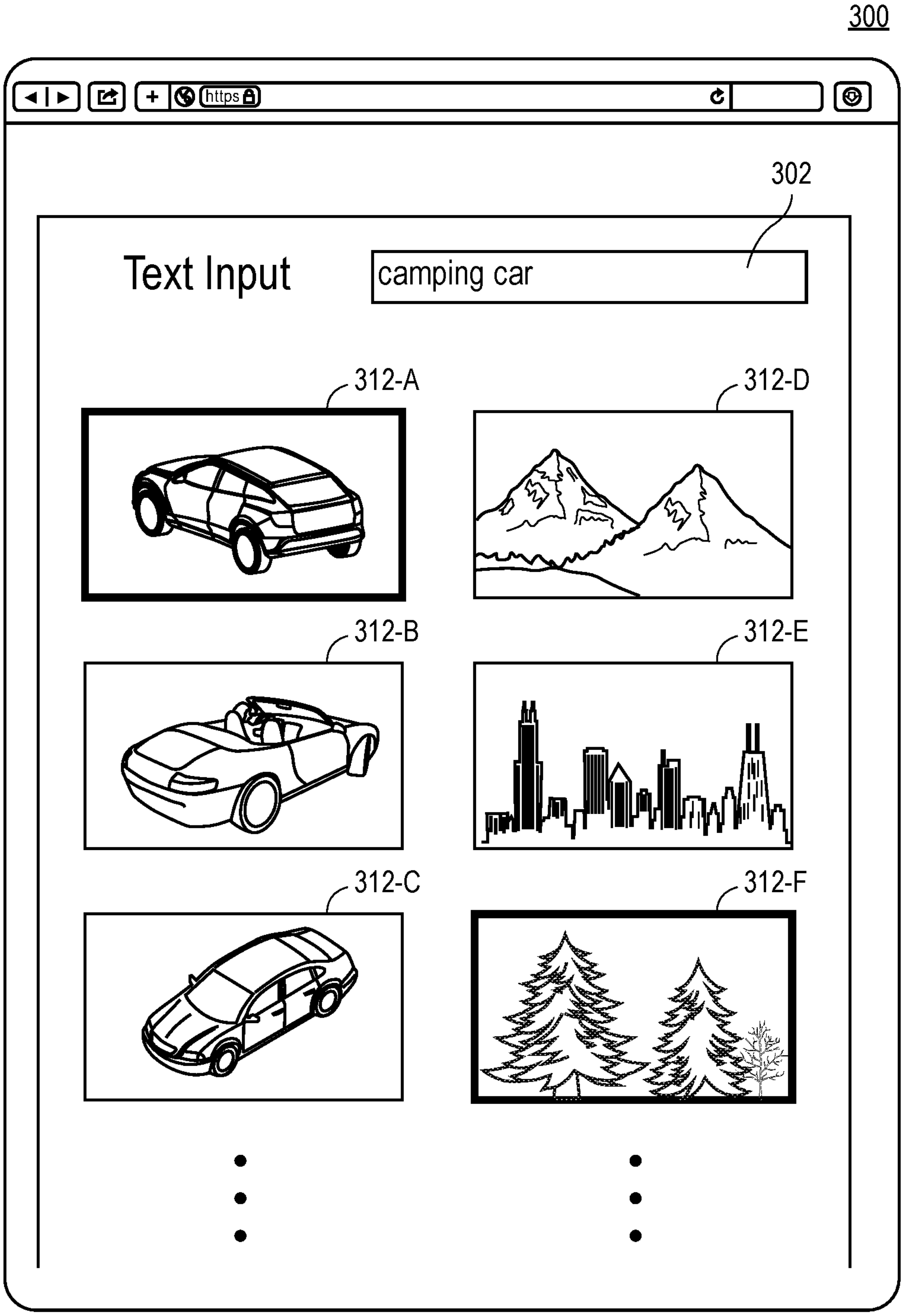
Figure 3C:
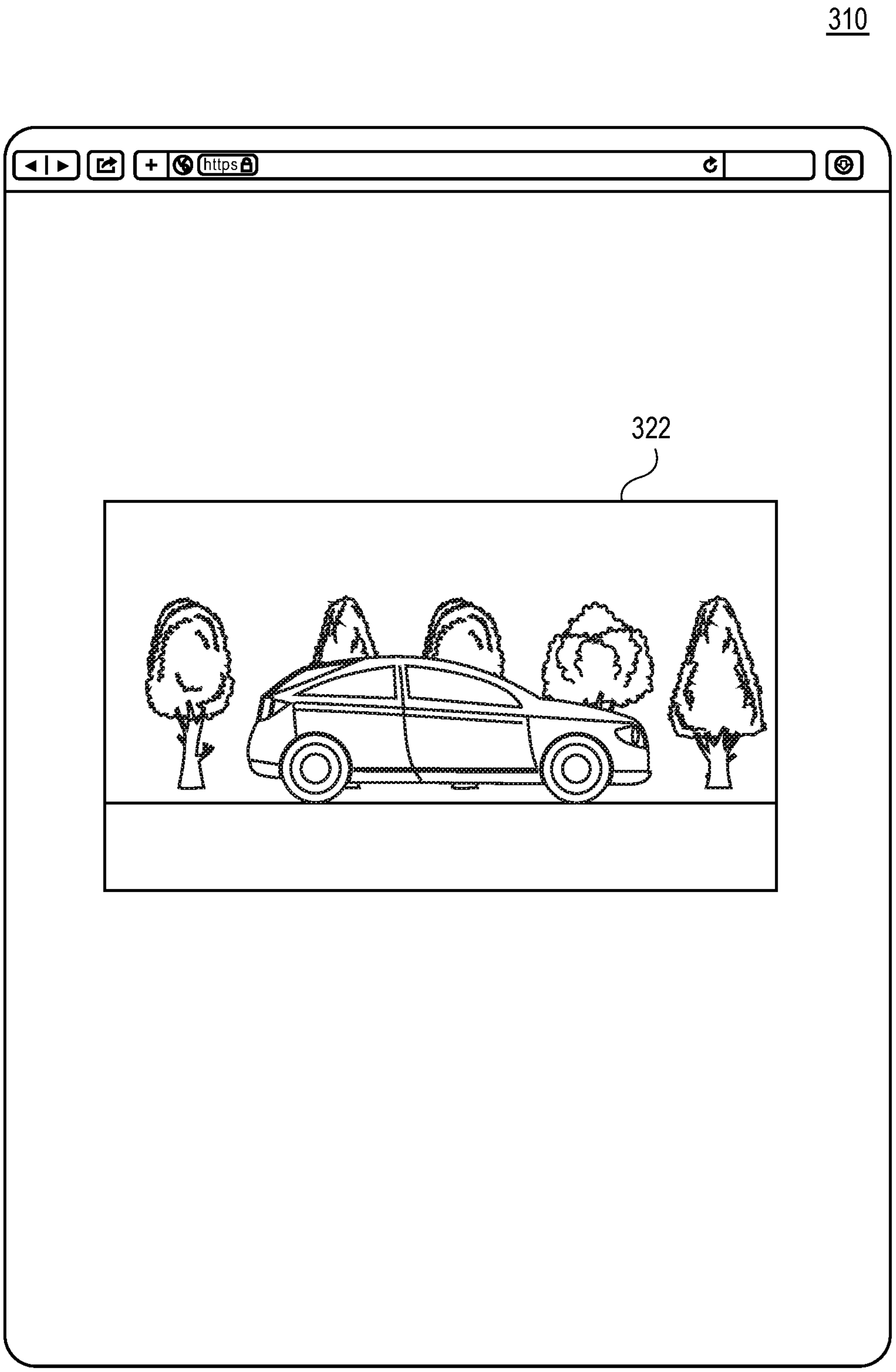

FIGS. 3A-3C are illustrations of exemplary user interfaces 300 and 310, according to exemplary embodiments of the present disclosure. The exemplary user interface 300 may be implemented, for example, in connection with the generation of content by a content generation service.

FIGS. 3A-3C illustrate exemplary user interfaces 300 and 310 that may be presented to a user in connection with a request for the generation of one or more content items to be included in a collection of content items. As shown in FIG. 3A, a user may be presented, via user interface 300, with text input field 302 and a collection of content items 312 (e.g., content items 312-A, 312-B, 312-C, 312-D, 312-E, 312-F, etc.).

Based on the presentation of text input field 302 and content items 312, a user may submit a request to generate a content item to be included in the collection of content items. For example, a user may enter a text input into text input field 302 and select one or more content items 312-A, 312-B, 312-C, 312-D, 312-E, and/or 312-F in connection with a request to generate content items to be included in the collection of content items 312. As shown in FIG. 3B, a user may, via interactions with user interface 300, specify a text input "camping car" in text input field 302 and may select content items 312-A and 312-F (as shown via the bolded boxes surrounding content items 312-A and 312-F, indicating that they have been selected by the user).

According to exemplary embodiments of the present disclosure, the "camping car" textual input provided in text input field 302 and content items 312-A and 312-F may be provided to a content generation service (e.g., content generation system 200, etc.), which may be configured to generate a content item based on the textual input provided in text input field 302 and content items 312-A and 312-F. For example, textual input provided in text input field 302 may be provided as a text input to the content generation service and content items 312-A and 312-F may be provided to the content generation service as supplemental information. In one exemplary implementation, content items 312-A and 312-F may be converted to a text token/embedding and provided to the content generation service as part of the textual input (e.g., the text input provided in text input field 302). Accordingly, a content item may be generated by the content generation service based on the textual input provided in text input field 302 and content items 312-A and 312-F for inclusion in the collection of content items 312 presented in user interface 300, according to exemplary embodiments of the present disclosure.

In an exemplary implementation, based on the textual input provided in text input field 302 and content items 312-A and 312-F, the content generation service may generate and present, via user interface 310, content item 322 for inclusion in the collection of content items 312, as shown in FIG. 3C. Although FIG. 3C shows only generated content item 322 alone, other implementations of the present disclosure may present generated content item 322 as part of the collection of content items for which it was generated.

Figure 4:
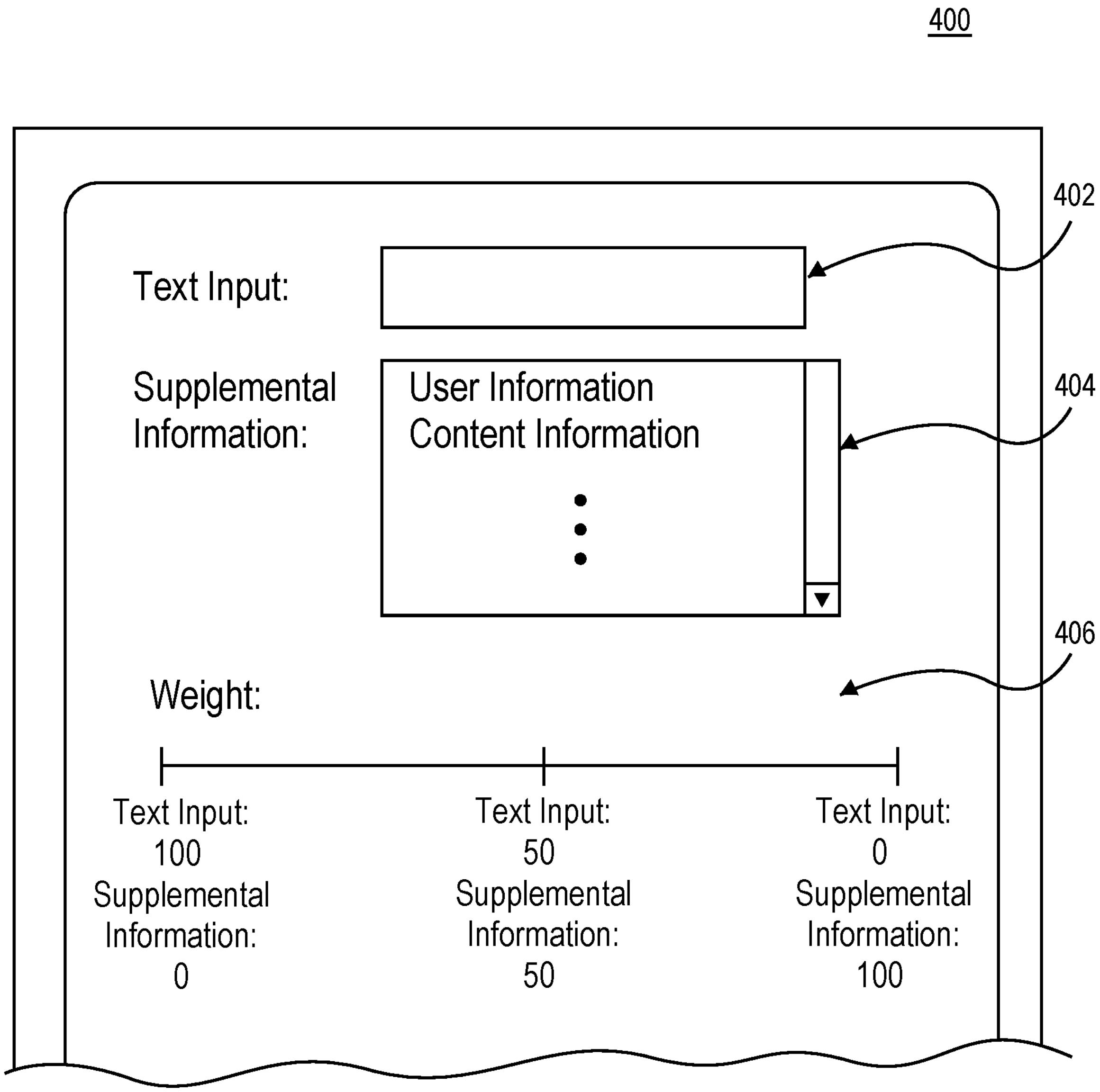
FIG. 4 is an illustration of an exemplary user interface, according to exemplary embodiments of the present disclosure.

FIG. 4 is an illustration of an exemplary user interface 400, according to exemplary embodiments of the present disclosure. The exemplary user interface 400 may be implemented, for example, in connection with the generation of content by a content generation service.

FIG. 4 illustrates an exemplary user interface 400 that may be presented to a user in connection with a request for the generation of one or more content items. As shown in FIG. 4, a user may, via interactions with user interface 400, specify certain inputs and/or parameters in connection with a request for the generation of content. Although FIG. 4 is an illustration of an exemplary user interface 400 where a user may specify various inputs and/or parameters in connection with a request for the generation of content, according to other implementations of the present disclosure, one or more of the various inputs and/or parameters associated with a request for the generation of content may be automatically obtained and/or determined by the content generation service (e.g., content generation service 125, content generation system 200, etc.) without any further input from the user.

According to exemplary embodiments of the present disclosure, exemplary user interface 400 may be presented to a user in connection with a user's request for the generation of one or more content items to a content generation system (e.g., content generation service 125, content generation system 200, etc.) that may be configured to generate content based on a textual input and supplemental information. For example, a user may, via interactions with exemplary user interface 400, provide a text input via text input box 402, specify a type of supplemental information via supplemental information control 404, and assign weights for the text input and the supplemental information via weight control 406. As illustrated, the user may supply a text string via text input box 402 and specify the type of supplemental information (e.g., user information, content information, etc.) via supplemental information control 404 in connection with a request to generate content, according to exemplary embodiments of the present disclosure. Accordingly, the content generation system may generate one or more content items based on the provided text input, the specified supplemental information, and any weights assigned by the user. Optionally, after specifying the type of supplemental information via supplemental information control 404, a further user interface may be presented to the user which may facilitate obtaining the supplemental information specified by the user via supplemental information control 404. Alternatively and/or in addition, the supplemental information may be automatically obtained and/or determined after the user has specified the type of supplemental information to be used in connection with the generation of the content item.

Additionally, according to exemplary embodiments of the present disclosure, a user may, via an interaction with user interface 400, specify weights for the text input and the supplemental information. As illustrated in FIG. 4, via an interaction with weight control 406, a user can assign weights that are to be applied to the text input and the supplemental information in connection with the generation of the one or more content items. For example, if the user selects to apply equal weights to the text input and the supplemental information (e.g., 50 and 50, respectively), the content generation system may equally weigh the text input and the supplemental information in generating the one or more content items. The user may also interact with user interface 400 so that the content generation system completely ignores the supplemental information (e.g., weight of 100 for the text input and weight of 0 for the supplemental information), completely ignores the text input (e.g., weight of 0 for the text input and weight of 100 for the supplemental information), or any value in between. Alternatively and/or in addition, the content generation system may be configured to assign default weights (e.g., 10-90, 20-80, 30-70, 40-60, 50-50, etc.) to the text input and the supplemental information, automatically determine and assign the weights to be applied to the text input and the supplemental information (e.g., based on the provided text input, supplemental information, etc.), and the like. For example, a request with a text input including a detailed description of the content item to be generated may result in a higher weight being assigned to the text input, whereas a request with a vague text input but supplemental information with a high level of confidence may result in a higher weight being assigned to the supplemental information. Accordingly, one or more content items may be generated and returned to the user based on the text input, the supplemental information, and the corresponding weights, that may be provided via user interface 400.

Figure 5:
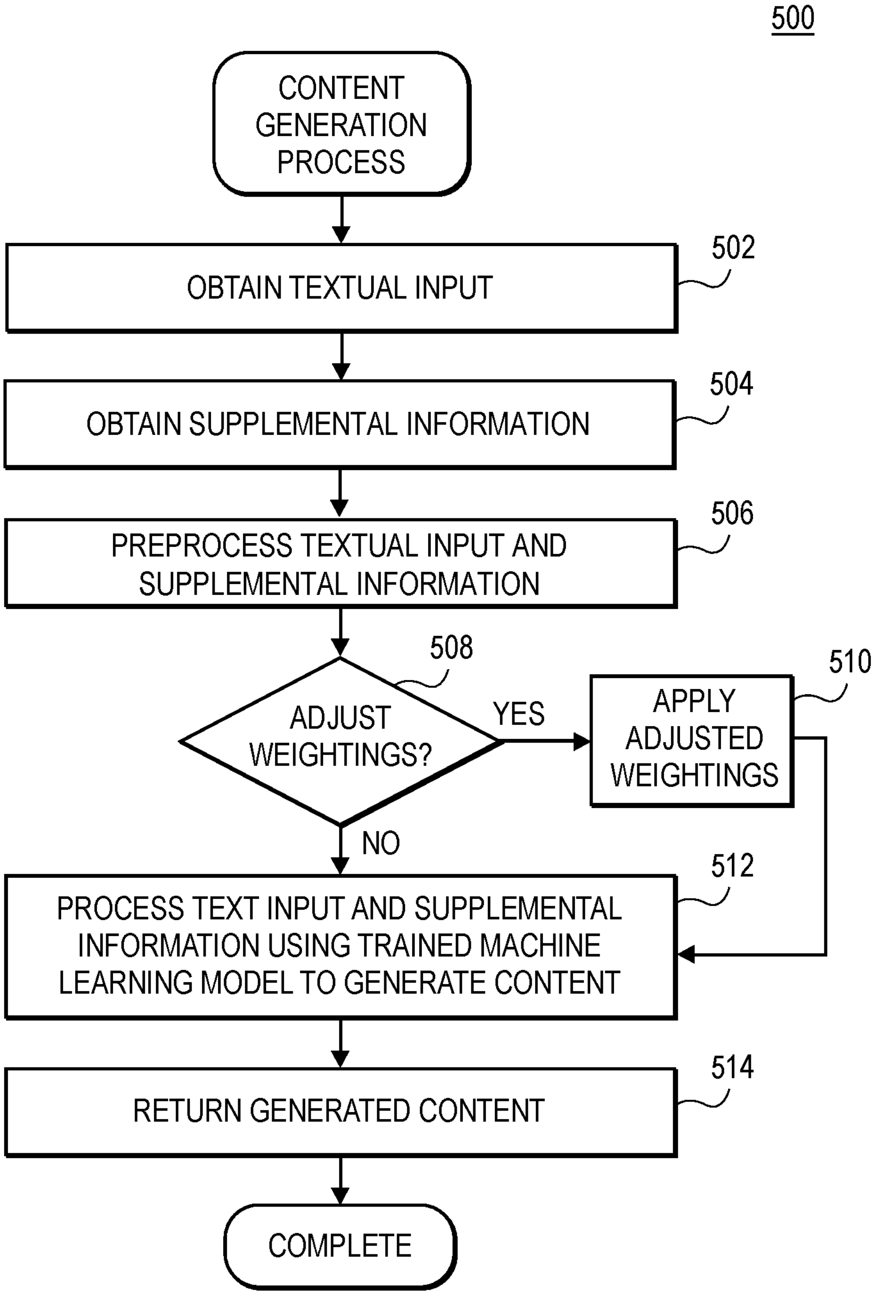
FIG. 5 is a flow diagram of an exemplary content generation process, according to exemplary embodiments of the present disclosure.

FIG. 5 is a flow diagram of an exemplary content generation process 500, according to exemplary embodiments of the present disclosure. Content generation process may be employed in response to a request to generate one or more content items by a content generation service or system based on both textual input and supplemental information.

As shown in FIG. 5, content generation process 500 may begin at step 502 with the obtaining of a textual input. The textual input may include, for example, a description of the content to be generated, a text query, keywords identified in connection with a request to access a homepage and/or home feed, keywords identified in connection with a request for recommended content items, and the like. According to aspects of the present disclosure, the textual input may include a text string of one or more words that may describe the content to be generated. For example, the textual input may simply include a single word, such as "car," "dog," "cat," etc. or a sequence of words, such "a black off-road vehicle on an off-road trail," "a red sports car on a track," "a black and white cat eating a fish," "mountain scene," etc. The textual input may be provided by a user requesting the generation of content or may be automatically generated based on other content and/or information associated with the user.

In step 504, supplemental information may also be obtained. The supplemental information may include any further information that may be processed by the content generation system in addition to the textual input in connection with the generation of content. For example, supplemental information may include user information, content information, and the like. The supplemental information may be encoded as representations of a user, content, etc. in the form of embeddings, vectors, or other features. In exemplary implementations where the supplemental information includes user information, the user information may include a user embedding that may be representative of the user. The user embedding may include a vector representation of the user that is generated by a trained machine learning model and may represent a user's preferences, a user's history, a user's past actions (e.g., content items with which the user may have interacted, etc.), a user's predicted actions (e.g., content items with which the user is predicted to interact, etc.), and the like. Alternatively and/or in addition, supplemental information may include content information, which may include a content embedding generated by a trained machine learning model and may include a vector representation of the content item that encodes certain features of the content item. In another exemplary embodiment, the supplemental information may include a set of content items. The set of content items may form at least part of a collection and may also be represented as a set of embeddings or vectors encoding features of the content items.

The textual input and the supplemental information may be preprocessed, as in step 506. According to exemplary embodiments of the present disclosure, preprocessing the textual input may include processing the text string that makes up the textual input with using one or more language models (e.g., natural language processing models, BERT models, etc.) that may be configured to parse the textual input into words and/or n-grams included in the textual input and generate one or more text embeddings that represent the words, n-grams, etc. included in the textual input. In one exemplary implementation, the text embeddings associated with each word and/or n-gram included in the textual input may be averaged to generate an overall text embedding that is representative of the textual input. Alternatively, a text embedding may be generated for each word or n-gram of the textual input to generate a sequence of the text embeddings for the textual input, where the sequence of the text embeddings may correspond to the order in which the words or n-grams appear in the textual input. According to yet another exemplary implementation, the supplemental information (e.g., in the form of embeddings, vectors, etc.) may be converted into one or more text tokens/embeddings (e.g., using a trained model such as an image encoder, etc.) and provided as part of the textual input.

In addition to generating one or more text embeddings that may represent the textual input, preprocessing the textual input and the supplemental information may also include combining representations of the textual input and the supplemental information. For example, in exemplary implementations where the supplemental information includes an embedding (e.g., a user embedding, a content embedding, etc.) that encodes and is representative of the supplemental information, preprocessing the textual input and the supplemental information may include combining the textual embedding(s) representing the textual input and the embedding(s) representing the supplemental information. According to exemplary implementations of the present disclosure where the textual input is represented by a single text embedding, the text embedding representative of the textual input may be concatenated with the embedding (e.g., user embedding, content embedding, etc.) that represents the supplemental information, and the concatenated embedding may then be provided to and processed to generate the one or more content items. In other implementations where the textual input is represented by a sequence of text embeddings, the embedding (e.g., user embedding, content embedding, etc.) representing the supplemental information may be appended to the sequence of text embeddings (e.g., as the first or last embedding in the sequence of embeddings, etc.), and the sequence of embeddings may be provided to generate the one or more content items. According to yet another exemplary implementation, the supplemental information may also be provided directly as a separate input.

In step 508, it may be determined whether weights assigned to the textual input and the supplemental information are to be adjusted. For example, the weights may be assigned by a user, as described herein in connection with FIG. 4, or may be automatically determined and assigned in connection with the generation of the one or more content items. According to certain aspects of the present disclosure, the weights may be determined based on the textual input and the supplemental information. For example, a request with a text input including a detailed description of the content item to be generated may result in a higher weight being assigned to the text input, whereas a request with a vague text input but supplemental information with a high level of confidence may result in a higher weight being assigned to the supplemental information. Accordingly, if the weights are to be adjusted, the adjusted weights may be applied in step 510. Otherwise, content generation process 500 may proceed to step 512.

As illustrated in FIG. 5, the textual input and the supplemental information may be processed by a trained machine learning model to generate content in response to the request to generate content. According to exemplary embodiments of the present disclosure, the trained machine learning model employed to generate the content may include one or more machine learning models trained and configured to generate content based on the textual input and the supplemental information. The machine learning model may have been trained on a training dataset that includes triplets of textual information, content, and supplemental information. In exemplary implementation where the supplemental information includes user information, the machine learning model may be trained on a training dataset including triplets of a text string, a content item, and a representation of a user across a corpus of users. For example, the machine learning model may be learned across a corpus of users (e.g., of an online service such as a social media network, a social networking service, a search service, a recommendation service, etc.) so that unrelated associations may be learned across the entire corpus of users.

In an exemplary implementation, the training data set may include triplets of user information (e.g., user embeddings, etc.), text queries submitted by the user, and content items with which the user interacted in response to the corresponding text queries. In one exemplary implementation where the supplemental information may include content information corresponding to content items included in a collection of content items, the training dataset may include triplets of textual information, a training content item, and content items that from a collection of content items that includes the training content item. Alternatively and/or in addition, the machine learning model may be trained using datasets having data records of any triplets that may include a text string, a content item, and any supplemental information which may be provided as an input to the machine learning model and processed in connection with the generation of content. Accordingly, in step 514, the generated content may then be provided to the user in response to the request for generated content.

Figure 6:
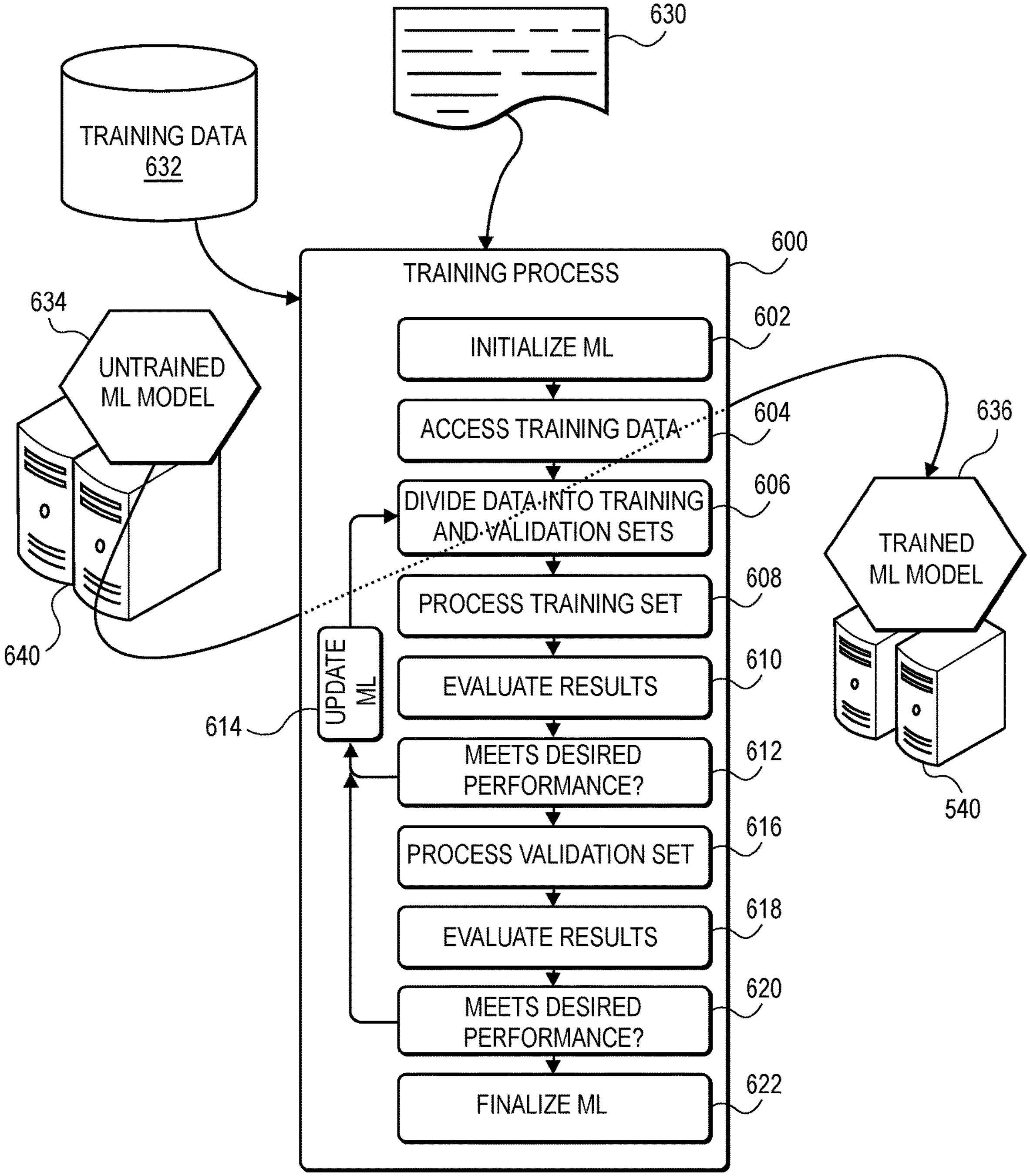
FIG. 6 is a flow diagram of an exemplary training process for training a machine learning model, according to exemplary embodiments of the present disclosure.

FIG. 6 is a flow diagram of an exemplary training process 600 for training a machine learning (ML) model (or other machine learning model, such as a DNN), according to exemplary embodiments of the present disclosure.

As shown in FIG. 6, training process 600 is configured to train an untrained ML 634 operating on computer system 640 to transform untrained ML 634 into trained ML 636 that operates on the same or another computer system, such as computing resource 120. In the course of training, as shown in FIG. 6, at step 602, untrained ML 634 is initialized with training criteria 630. Training criteria 630 may include, but is not limited to, information as to a type of training, and number of layers to be trained, etc.

At step 604 of training process 600, corpus of training data 632, may be accessed. For example, training data 632 may include triplets of data that include a text string, a content item, and supplemental information. In one exemplary implementation, the triplets of data may include a text query submitted by a user, content items engaged by the user in response to the text query, and a user embedding representative of the user. In another exemplary implementation, the training dataset may include triplets of textual information, a training content item, and content items that from a collection of content items that includes the training content item.

With training data 632 accessed, at step 606, training data 632 may be divided into training and validation sets. Generally speaking, the items of data in the training set are used to train untrained ML 634 and the items of data in the validation set are used to validate the training of the ML. As those skilled in the art will appreciate, and as described below in regard to much of the remainder of training process 600, there are numerous iterations of training and validation that occur during the training of the ML.

At step 608 of training process 600, the data items of the training set are processed, often in an iterative manner. Processing the data items of the training set may include capturing the processed results. After processing the items of the training set, at step 610, the aggregated results of processing the training set are evaluated, and at step 612, a determination is made as to whether a desired performance level has been achieved. If the desired performance level is not achieved, in step 614, aspects of the machine learning model are updated in an effort to guide the machine learning model to improve its performance, and processing returns to step 606, where a new set of training data is selected, and the process repeats. Alternatively, if the desired performance level is achieved, training process 500 advances to step 616.

At step 616, and much like step 608, the data items of the validation set are processed, and at step 618, the processing performance of this validation set is aggregated and evaluated. At step 620, a determination is made as to whether a desired performance level, in processing the validation set, has been achieved. If the desired performance level is not achieved, in step 614, aspects of the machine learning model are updated in an effort to guide the machine learning model to improve its performance, and processing returns to step 606. Alternatively, if the desired accuracy level is achieved, the training process 600 advances to step 622. At step 622, a finalized, trained ML 636 is generated. Typically, though not exclusively, as part of finalizing the now-trained ML 636, portions of the ML that are included in the model during training for training purposes are extracted, thereby generating a more efficient trained ML model 636.

Although FIG. 6 is described primarily with respect to training a new ML model, aspects of the present disclosure also contemplate training existing text-to-image models to include additional adapter layers to process the supplemental information.

Figure 7:
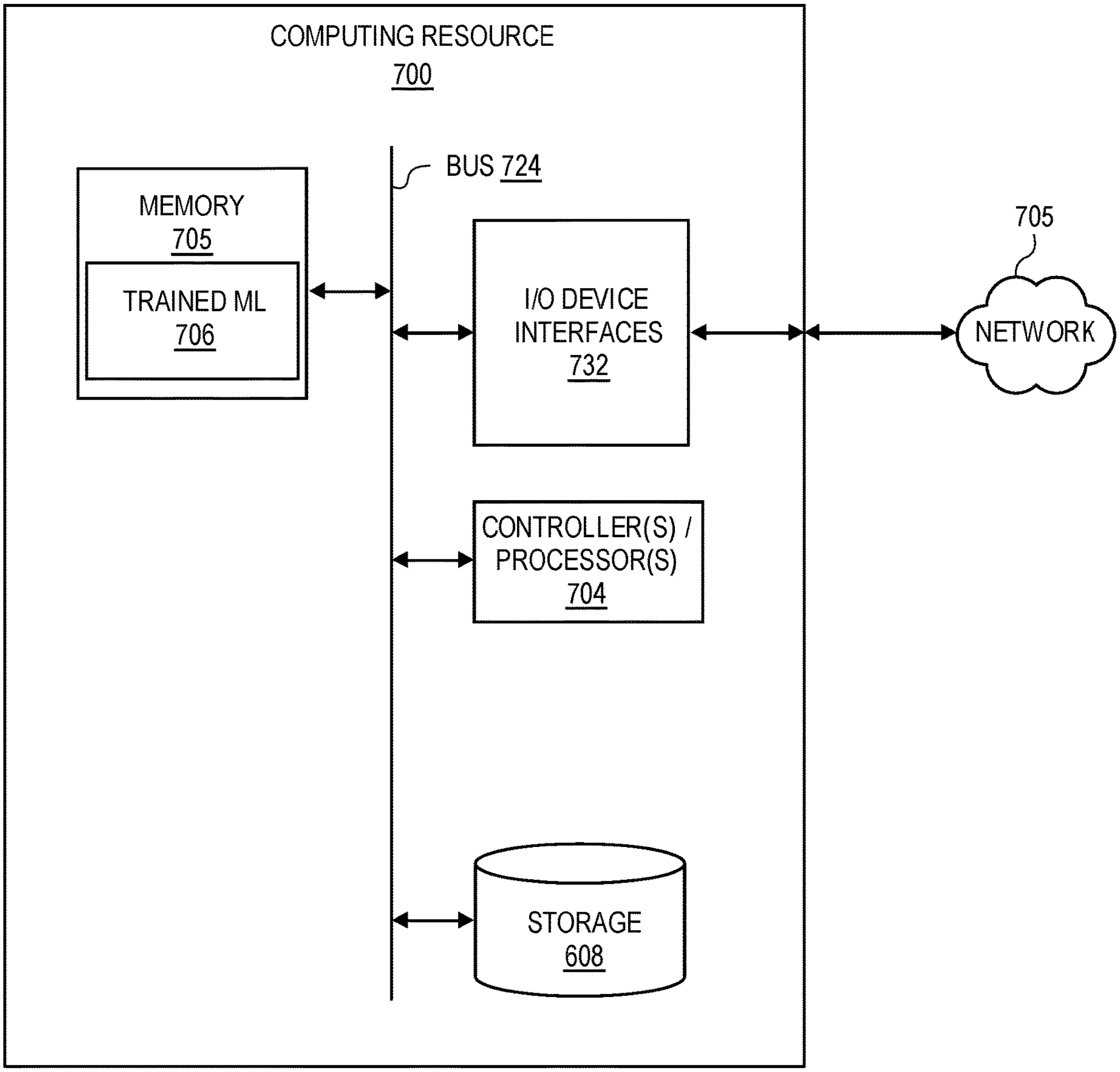
FIG. 7 is a block diagram of an exemplary computing resource, according to exemplary embodiments of the present disclosure.

FIG. 7 is a block diagram conceptually illustrating example components of a remote computing device, such as computing resource 700 (e.g., computing resources 120, etc.) that may be used with the described implementations, according to exemplary embodiments of the present disclosure.

Multiple such computing resources 700 may be included in the system. In operation, each of these devices (or groups of devices) may include computer-readable and computer-executable instructions that reside on computing resource 700, as will be discussed further below.

Computing resource 700 may include one or more controllers/processors 704, that may each include a CPU for processing data and computer-readable instructions, and memory 705 for storing data and instructions. Memory 705 may individually include volatile RAM, non-volatile ROM, non-volatile MRAM, and/or other types of memory. Computing resource 700 may also include a data storage component 708 for storing data, user actions, content items, user information, content information, other supplemental information, etc. Each data storage component may individually include one or more non-volatile storage types such as magnetic storage, optical storage, solid-state storage, etc. Computing resource 700 may also be connected to removable or external non-volatile memory and/or storage (such as a removable memory card, memory key drive, networked storage, etc.) through input/output device interfaces 732.

Computer instructions for operating computing resource 700 and its various components may be executed by the controller(s)/processor(s) 704, using memory 705 as temporary "working" storage at runtime. The computer instructions may be stored in a non-transitory manner in non-volatile memory 705, storage 708, or an external device(s). Alternatively, some or all of the executable instructions may be embedded in hardware or firmware on computing resource 700 in addition to or instead of software.

For example, memory 705 may store program instructions that when executed by the controller(s)/processor(s) 704 cause the controller(s)/processors 704 to process textual information, supplemental information, etc. using trained machine learning model 706 to generate one or more content items based on the textual information and the supplemental information, as discussed herein.

Computing resource 700 also includes input/output device interface 732. A variety of components may be connected through input/output device interface 732. Additionally, computing resource 700 may include address/data bus 724 for conveying data among components of computing resource 700. Each component within computing resource 700 may also be directly connected to other components in addition to (or instead of) being connected to other components across bus 724.

The disclosed implementations discussed herein may be performed on one or more computing resources, such as computing resource 700 discussed with respect to FIG. 7 or performed on a combination of one or more computing resources. Further, the components of the computing resource 700, as illustrated in FIG. 7, are exemplary, and may be located as a stand-alone device or may be included, in whole or in part, as a component of a larger device or system.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Persons having ordinary skill in the field of computers, communications, media files, and machine learning should recognize that components and process steps described herein may be interchangeable with other components or steps, or combinations of components or steps, and still achieve the benefits and advantages of the present disclosure. Moreover, it should be apparent to one skilled in the art that the disclosure may be practiced without some, or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk and/or other media. In addition, components of one or more of the modules and engines may be implemented in firmware or hardware.

Moreover, with respect to the one or more methods or processes of the present disclosure shown or described herein, including but not limited to the flow charts shown in FIGS. 4 and 5, orders in which such methods or processes are presented are not intended to be construed as any limitation on the claims, and any number of the method or process steps or boxes described herein can be combined in any order and/or in parallel to implement the methods or processes described herein. In addition, some process steps or boxes may be optional. Also, the drawings herein are not drawn to scale.

The elements of a method, process, or algorithm described in connection with the implementations disclosed herein can also be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be any of X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" or "a device operable to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

Although the invention has been described and illustrated with respect to illustrative implementations thereof, the foregoing and various other additions and omissions may be made therein and thereto without departing from the spirit and scope of the present disclosure.

What is claimed is:

1. A computing system, comprising:

one or more processors; and a memory storing program instructions that, when executed by the one or more processors, cause the one or more processors at least:

access a training dataset including a plurality of training data records, the plurality of training data records including triplets of data for a plurality of users, one or more triplets of data comprising a training text string submitted by a first user, a training image submitted by the first user, and training supplemental information comprising a user embedding vector representative of the first user;

train a machine learning model using the training dataset to generate an image based at least in part on a textual input and a supplemental information;

receive, by the trained machine learning model, a text input provided by a second user and a supplemental information input comprising a user embedding vector representative of the second user;

generate, using the trained machine learning model, a rendered image based at least in part on the text input and the supplemental information input; and return the rendered image to the second user.

2. The computing system of claim 1, wherein the user embedding vector representative of the second user is used to predict at least one content item with which the second user is expected to engage.

3. The computing system of claim 1, wherein the supplemental information input further includes a content embedding for the second user, the content embedding representative of at least one content item that the second user has interacted with.

4. The computing system of claim 1, wherein the supplemental information input includes a plurality of content items that form at least a portion of a collection and the rendered image is generated to be included in the collection.

5. The computing system of claim 1, wherein the program instructions that, when executed by the one or more processors, further cause the one or more processors to at least determine a first weight for the textual input and a second weight for the supplemental information input.

6. The computing system of claim 5, wherein determining the first weight and the second weight includes receiving the first weight and the second weight via a user interaction with a user interface.

7. A computer-implemented method, comprising:

receiving, from a client device associated with a user, a text input;

receiving a supplemental information embedding vector associated with the user, the supplemental information embedding vector comprising user interactions with respective content items;

providing the text input and the supplemental information embedding to a machine learning model trained to generate a rendered image based at least in part on the text input and the supplemental information embedding, the machine learning model trained based on a training dataset comprising triplets of data for a plurality of users, one or more respective triplets of data comprising a training text string submitted by a corresponding user, a training image submitted by the corresponding user, and training supplemental information comprising a user embedding vector representative of the corresponding user;

generating, by the machine learning model, the rendered image; and providing the rendered image to the client device in response to the text input.

8. The computer-implemented method of claim 7, wherein the supplemental information embedding further includes a content embedding representative of a plurality of content items with which the corresponding user of the plurality of users has interacted.

9. The computer-implemented method of claim 8, wherein the plurality of content items form at least a portion of a collection and the rendered image is generated to be included in the collection.

10. The computer-implemented method of claim 7, wherein the supplemental information embedding is used to predict at least one content item with which the user is expected to engage.

11. The computer-implemented method of claim 7, further comprising:

determining a sequence of text embeddings representative of the text input; and including the supplemental information embedding in the sequence of text embeddings to generate an updated input sequence of embeddings, wherein the machine learning model is configured to receive the updated input sequence of embeddings as an input and generate the rendered image based at least in part on the updated input sequence of embeddings.

12. The computer-implemented method of claim 7, further comprising:

determining an overall text embedding representative of the text input; and concatenating the supplemental information embedding with the overall text embedding to generate an updated overall input embedding, wherein the machine learning model is configured to receive the updated overall input embedding as an input and generate the rendered image based at least in part on the updated overall input embedding.

13. The computer-implemented method of claim 7, wherein:

the text input is received as a search query; and the method further comprises:

determining a plurality of responsive content items;

providing the plurality of responsive content items; and providing the rendered image as provided as a responsive content item.

14. The computer-implemented method of claim 7, further comprising determining a first weight for the text input and a second weight for the user information.

15. The computer-implemented method of claim 14, wherein determining the first weight and the second weight includes receiving the first weight and the second weight via a user interaction with a user interface.

16. The computer-implemented method of claim 7, further comprising:

accessing the training dataset including a plurality of training data records; and training the machine learning model using the training dataset to generate images based at least in part on textual inputs and supplemental information.

17. A computer-implemented method, comprising:

training, using a plurality of training data sets, a machine learning model to generate an image based at least in part on an input text string and a plurality of content items, wherein one or more of the plurality of training data sets includes triplets of data for a plurality of users, one or more triplets of data comprising a training text string submitted by the first user, a training image engaged with by the first user in response to the text input, and a training collection of content items, wherein the training image belongs to the training collection of content items;

receiving, at the trained machine learning model, a text input provided by a second user;

receiving, at the trained machine learning model, a plurality of example content items provided by the second user that form at least a portion of a collection of content items;

generating, using the trained machine learning model and based at least in part on the text input and the plurality of example content items, a rendered image; and providing, in response to the text input, the rendered image.

18. The computer-implemented method of claim 17, further comprising:

determining a sequence of text embeddings representative of the text input;

generating an embedding representative of the plurality of content items; and including the embedding to the sequence of text embeddings to generate an updated input sequence of embeddings, wherein the trained machine learning model is configured to receive the updated input sequence of embeddings as an input and generate the rendered image based at least in part on the updated input sequence of embeddings.

19. The computer-implemented method of claim 17, wherein the rendered image is generated to be included as part of the collection.

20. The computer-implemented method of claim 17, further comprising determining a first weight for the text input and a second weight for the plurality of content items.

* * * * *